W. SCOTT.
ANIMAL TRAP.
APPLICATION FILED NOV. 13, 1911.

1,029,087.

Patented June 11, 1912.

Witnesses

Inventor
Wm Scott
By Howard Drinton
Attorney

UNITED STATES PATENT OFFICE.

WILLIAM SCOTT, OF LITITZ, PENNSYLVANIA, ASSIGNOR TO ONEIDA COMMUNITY, LIMITED, OF ONEIDA, NEW YORK, A CORPORATION OF NEW YORK.

ANIMAL-TRAP.

1,029,087.   Specification of Letters Patent.   Patented June 11, 1912.

Application filed November 13, 1911. Serial No. 660,071.

*To all whom it may concern:*

Be it known that I, WILLIAM SCOTT, of Lititz, in the county of Lancaster, in the State of Pennsylvania, have invented new and useful Improvements in Animal-Traps, of which the following, taken in connection with the accompanying drawings, is a full, clear, and exact description.

This invention relates to certain improvements in animal traps involving the use of interlocking ring jaws spring connected to each other and adapted to overlap with their centers in close proximity when set against the action of the spring in which position they are held by a suitable trigger and detent, whereby when the trigger is tripped by the entrance of any portion of the animal through the openings in both rings it will release the detent and allow opposite sides of the rings or jaws to close upon the animal by the action of the spring.

My object is to produce a light, strong and comparatively inexpensive animal trap having a wide range of efficiency in trapping animals of different sizes and which is capable of being more easily concealed flatwise within a minimum space upon the ground or in the mouth of the hole which the animal is most liable to frequent.

Another object is to provide simple means for positively holding the jaws in their set position and at the same time is capable of being released by the slightest contact of the animal with the trigger to allow the jaws to close with considerable power upon the animal under the action of the spring.

Other objects and uses will be brought out in the following description.

Figure 1:
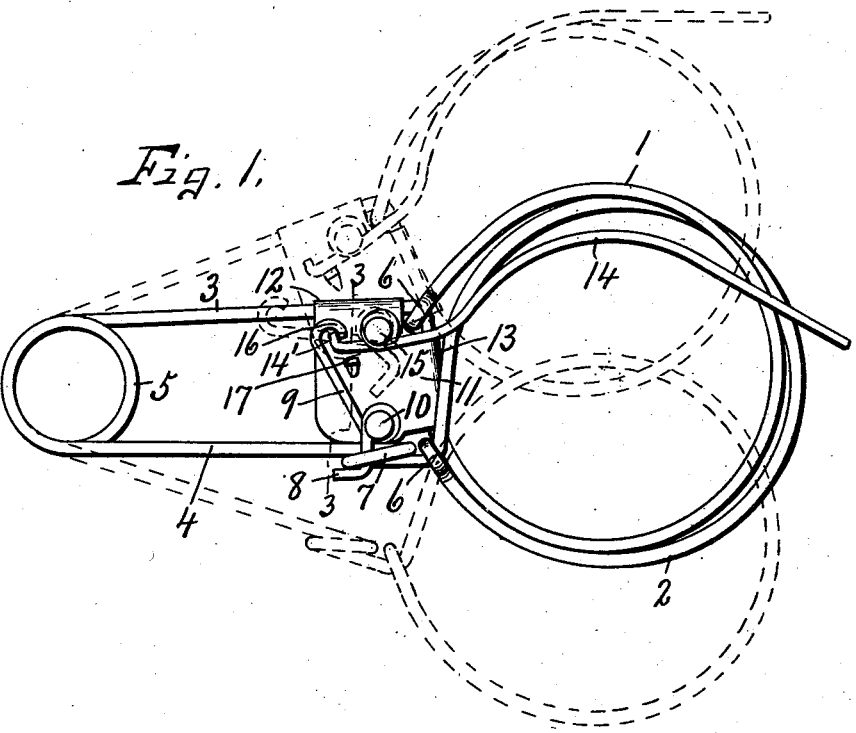
Figure 2:
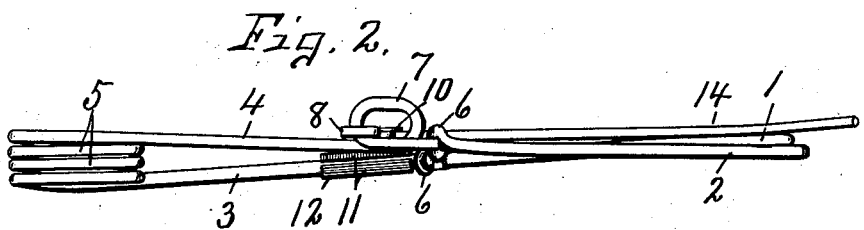
Figure 3:
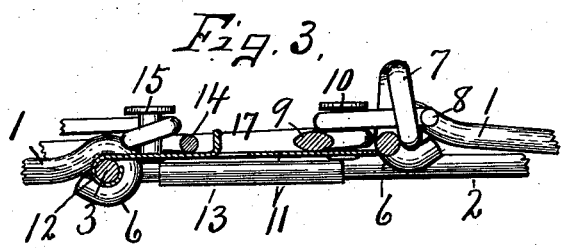

In the drawings—Figure 1 is a top plan of an animal trap embodying the various features of my invention, said trap being shown in its set position by full lines and in its closed position by dotted lines. Fig. 2 is a side elevation of the set trap shown in Fig. 1. Fig. 3 is an enlarged transverse sectional view taken on line 3—3, Fig. 1.

This trap comprises a pair of circular jaws or rings —1— and —2— having spring arms —3— and —4— projecting laterally from one side thereof and united at their outer ends some distance from the rings —1— and —2— by a coiled spring 5—, the arms —3— and —4— and coiled spring being tensioned so as to normally tend to force the rings apart or from their superposed set positions. The rings —1— and —2— and their arms —3— and —4— together with the coiled spring —5— are preferably disposed in nearly the same plane at right angles to the axes of the rings and are formed from a single piece of spring wire of suitable gage, the arms —3— and —4— being substantially straight and located just at the outside of a direct line drawn between the centers of the rings and the center of the coil —5—, thereby forming comparatively sharp angles at their junctions with said rings. The coil —5— is made from the intermediate portions of the wire, while the arms —3— and —4— are extended tangentially to the coil and their ends are bent in the form of circles to form the jaws —1— and —2— and terminate in eyes —6— which are looped around and interlock, with the junctions of the arms with the rings, thereby maintaining the circular forms of the rings. The arm —4— near its junction with the corresponding ring jaw —2— is bent into the form of a loop —7— for interlocking engagement with an offset end —8— of a detent —9— which is pivoted at —10— to a plate —11—. This plate is preferably made of sheet metal and has its outer side and inner end bent in the form of eyes —12— and —13— embracing the arm —3— and adjacent portion of the ring —1—.

A trigger —14— is pivoted at —15— to the plate —11— and is composed of relatively long and short arms, the longer arm being of sufficient length to extend across the openings in the rings when the jaws are set at one side of the center thereof so that its free end is free to rest or slide upon the outer face of the adjacent ring, the shorter arm being provided with a lateral offset —14'—for interlocking engagement with a corresponding offset —16— of the detent —9— whereby the detent is normally held in interlocking engagement with the loop —7— to hold the jaws in their set position with the openings in the rings registering with each other against the action of the spring arms —3— and —4—.

A portion of the plate —11— is cut and stamped or pressed up to form a stop shoulder —17— located in the path of movement of the short arm of the trigger —14— so as to limit the rocking movement of said trigger in one direction or rather outwardly beyond the corresponding side of the ring, thereby keeping the trigger at all times in position for interlocking connection with the detent —9—.

It will be observed that the offset portion —8— of the detent —9— is disposed at the side of the pivot —10— toward the wire —5— and that the corresponding side of the loop —7— is interlocked therewith when the trap is set so that the spring arms normally exert pressure upon the adjacent end of the detent at one side of its pivot tending to rock the other end of the detent toward the coil, such rocking movement being limited by the shoulder —14'— on the trigger —14— and therefore the shoulders —14'— and —16— are normally held in frictional interlocking engagement when the trap is set, under which conditions the longer arm of the trigger extends across one side of the openings in the ring jaws —1— and —2— so that any portion of the animal which may pass through the openings in the ring and come in contact with the trigger —14— will instantly rock said trigger under the lightest pressure from its holding position to release its engagement with the detent —9— which will then be also rocked from its holding position by the opening tension of the spring arms, causing the shorter arm of the detent —9— having the offset —8— to pass through the loop —7— to permit the intersecting portions of the spring to close upon the animal and thereby firmly hold the latter under the tension of the spring.

It will be observed upon reference to the dotted intersecting portions of the jaws shown in Fig. 1 that when an animal is caught between the intersecting sides of the rings, these portions of the ring tend to contract or wedge against the portion of the animal which may be caught therein, thereby gradually reducing the size of the opening in which the animal is caught and assuring a more positive retention of such animal in the trap.

In resetting the trap, it is simply necessary to compress the spring arms —3— and —4— toward each other until the openings in the ring jaws —1— and —2— are registered and the shorter arm of the detent —9— having the offset —8— passed through and interlocked with the loop —7—, whereupon the trigger —14— is rocked by hand to engage its shoulder —15— with the coacting shoulder —16— on the detent, thus holding the jaws in their set position.

The trigger —14— is relatively long and made of bendable wire which permits it to be easily bent for proper adjustment relatively to the center of the opening.

What I claim is:

An animal trap comprising a pair of connected arms spring tensioned to spread apart, said arms being provided with ring jaws having portions thereof disposed in intersecting planes, a plate secured to one of said arms and to the corresponding ring, a trigger and detent mounted on said plate for coöperative engagement, and means on the lower arm for interlocking engagement with a portion of the detent when the trap is set.

In witness whereof I have hereunto set my hand on this 4th day of Nov. 1911.

WILLIAM SCOTT.

Witnesses:
 WILSON GANTZ,
 THEO. KELLER.

---

Copies of this patent may be obtained for five cents each, by addressing the "Commissioner of Patents, Washington, D. C."